US012272328B2

(12) United States Patent
Zheng

(10) Patent No.: US 12,272,328 B2
(45) Date of Patent: Apr. 8, 2025

(54) PIXEL DRIVING ARCHITECTURE HAVING DIFFERENT DRIVING INVERSIONS, DISPLAY PANEL AND DISPLAY DEVICE THEREOF

(71) Applicants: Huizhou China Star Optoelectronics Display Co., Ltd., Huizhou (CN); TCL China Star Optoelectronics Technology Co., Ltd., Shenzhen (CN)

(72) Inventor: Xiaoping Zheng, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/603,344

(22) PCT Filed: Jul. 22, 2021

(86) PCT No.: PCT/CN2021/107974
§ 371 (c)(1),
(2) Date: Oct. 13, 2021

(87) PCT Pub. No.: WO2023/272820
PCT Pub. Date: Jan. 5, 2023

(65) Prior Publication Data

US 2024/0212641 A1 Jun. 27, 2024

(30) Foreign Application Priority Data

Jun. 30, 2021 (CN) ......................... 202110733572.0

(51) Int. Cl.
*G09G 3/36* (2006.01)

(52) U.S. Cl.
CPC ......... *G09G 3/3614* (2013.01); *G09G 3/3607* (2013.01); *G09G 2300/0452* (2013.01); *G09G 2320/0247* (2013.01)

(58) Field of Classification Search
CPC .................................................... G09G 3/3614
(Continued)

(56) References Cited

U.S. PATENT DOCUMENTS

2004/0178981 A1* 9/2004 Asada .................. G09G 3/3614 345/96
2006/0119559 A1* 6/2006 Jung .................... G09G 3/3614 345/96

(Continued)

FOREIGN PATENT DOCUMENTS

CN 101165547 A 4/2008
CN 102629453 A 8/2012

(Continued)

*Primary Examiner* — Long D Pham
(74) *Attorney, Agent, or Firm* — Nathan & Associates; Menachem Nathan

(57) ABSTRACT

This application discloses a pixel driving architecture, a display panel, and a display device. The pixel driving architecture uses three hybrid inversion modes of column inversion, one-plus-two-line point inversion, and two-line point inversion to drive the display panel. This improves the subjective vertical flicker brought about when the Strip architecture is driven by the driving mode of column inversion alone, and compared with the one-plus-two-line point inversion or two-line point inversion driving mode, the charging effect of the panel is better, and can make the twill disappear.

13 Claims, 6 Drawing Sheets

(58) Field of Classification Search
USPC .......................................................... 345/209
See application file for complete search history.

(56) References Cited

U.S. PATENT DOCUMENTS

| | | | | |
|---|---|---|---|---|
| 2008/0100599 | A1 | 5/2008 | Kinoshita | |
| 2015/0170598 | A1* | 6/2015 | Jeon .................... | G09G 3/3614 345/96 |

FOREIGN PATENT DOCUMENTS

| | | | |
|---|---|---|---|
| CN | 102968968 | A | 3/2013 |
| CN | 103208265 | A | 7/2013 |
| CN | 103456277 | A | 12/2013 |
| CN | 104317121 | A | 1/2015 |
| CN | 106340279 | A | 1/2017 |
| CN | 109599073 | A | 4/2019 |
| CN | 110085178 | A | 8/2019 |
| CN | 111009224 | A | 4/2020 |
| CN | 111768743 | A | 10/2020 |
| JP | 2008216893 | A | 9/2008 |
| WO | 2007080864 | A1 | 7/2007 |

* cited by examiner

PIXEL DRIVING ARCHITECTURE HAVING DIFFERENT DRIVING INVERSIONS, DISPLAY PANEL AND DISPLAY DEVICE THEREOF

CROSS REFERENCE TO RELATED APPLICATIONS

This application is a US national phase application based upon an International Application No. PCT/CN2021/107974, filed on Jul. 22, 2021, which claims the priority of Chinese Patent Application No. 202110733572.0, entitled "PIXEL DRIVING ARCHITECTURE, DISPLAY PANEL AND DISPLAY DEVICE", filed on Jun. 30, 2021, the disclosure of which is incorporated herein by reference in its entirety.

BACKGROUND OF DISCLOSURE

1. Field of Disclosure

The present application relates to the field of display technology and, in particular, to a pixel drive architecture, a display panel including the pixel drive architecture and a display device including the display panel.

2. Description of Related Art

To solve the problem of insufficient charging on large-size UD (Ultra High Definition) or LCD panels with a resolution of 8K, please refer to FIG. 1, where the Strip architecture and a column inversion driving mode are generally used. However, in this driving mode, uniformity of the CFcom electrode on the color film substrate is poor, which in turn leads to poor flicker uniformity, and in turn leads to a difference in positive and negative feedthrough voltages resulting in a difference in brightness between positive and negative frames, forming a vertical pitch between bright and dark lines, resulting in subjective vertical flicker (V-line). The larger the pixel size, the more severe the subjective vertical flicker.

To improve the vertical flicker, it is usually preferred to use symmetric code to minimize the brightness difference between the positive and negative frames to reduce the vertical flicker. But due to the need to balance the panel display resolution (U %) at the same time and the symmetric code will suffer other panel stylish, the degree of reduction is very limited.

On this basis, if the level of the vertical flicker is still unacceptable, the driving mode of a one-plus-two-line point reversal arrangement (1+2Line) or a two-line point reversal arrangement (2Line) will be used (as depicted in FIG. 2 and FIG. 3). But the use of these two driving modes will deteriorate the charging and cause the panel to twill.

SUMMARY

The embodiments of the present application provide a pixel driving architecture, a display panel having the pixel driving architecture, and a display device having the display panel to solve the problem that the degree of reduction of vertical flicker by the existing column inversion pixel driving architecture is limited.

The embodiment of the application provides a pixel driving architecture. The pixel driving architecture includes a plurality of pixel units and a plurality of data lines. The plurality of pixel units are arranged in parallel and at intervals along a row direction, each of the pixel units includes a plurality of sub-pixels arranged at intervals along a column direction. The plurality of data lines are arranged along the column direction and arranged at intervals between the plurality of pixel units along the row direction, one of the pixel units corresponds to one of the data lines, and the sub-pixels in the one of the pixel units are respectively connected with the one of the data lines. When displaying an Nth frame of image, a polarity arrangement of the sub-pixels in the pixel units is one of following three arrangements: a first arrangement is that polarities of the sub-pixels in the pixel unit are same and polarities of the sub-pixels in two adjacent pixel units are opposite, forming a column inversion arrangement of the polarities of the sub-pixels in the pixel unit: a second arrangement is that the sub-pixels in the M-th row in the pixel unit have a same polarity as the sub-pixels in the (M+1)-th row, the sub-pixels in the (M+2)-th row have an opposite polarity to the sub-pixels in the M-th row, and the polarities of the sub-pixels in two adjacent pixel units are opposite, forming a one-plus-two-line point inversion arrangement of the polarities of the sub-pixels in the pixel unit: and a third arrangement is that the polarities of the sub-pixels in the M-th row and the sub-pixels in the (M+1)-th row are same, and the polarities of the sub-pixels in the (M+2)-th row and the sub-pixels in the (M+3)-th row are opposite to the polarity of the sub-pixels in the M-th row, forming a two-line point inversion arrangement of the polarities of the sub-pixels in the pixel unit. When displaying an (N+1)-th frame of image, the polarity arrangement of the sub-pixels in the pixel unit is another one of the three arrangements. When displaying the (N+2)-th frame of image, the polarity of the sub-pixels in the pixel unit is opposite to the polarity of the sub-pixels when the pixel unit displays the N-th frame of image. When displaying the (N+3)-th frame of image, the polarity of the sub-pixels in the pixel unit is opposite to the polarity of the sub-pixels when the pixel unit displays the (N+1)-th frame of image. Both M and N are positive integers.

Further, the polarity arrangement of a single sub-pixel in the pixel unit uses 4 frames as a period cycle.

Further, when displaying the N-th frame of image, the polarity arrangement of the sub-pixels in the pixel unit is the column inversion arrangement. When displaying the (N+1)-th frame of image, the polarity arrangement of the sub-pixels in the pixel unit is the one-plus-two-line point inversion arrangement or the two-line point inversion arrangement. When displaying the (N+2)-th frame of image, the polarity of the sub-pixels in the pixel unit is opposite to the polarity of the sub-pixels when the pixel unit displays the N-th frame of image. When displaying the (N+3)-th frame of image, the polarity of the sub-pixels in the pixel unit is opposite to the polarity of the sub-pixels when the pixel unit displays the (N+1)-th frame of image.

Further, when displaying the N-th frame of image, the arrangement of the polarities of the sub-pixels in the pixel unit is the one-plus-two-line point inversion arrangement or the two-line point inversion arrangement. When displaying the (N+1)-th frame of image, the arrangement of the polarities of the sub-pixels in the pixel unit is the column inversion arrangement. When displaying the (N+2)-th frame of image, the polarity of the sub-pixels in the pixel unit is opposite to the polarity of the sub-pixels when the pixel unit displays the N-th frame of image. When displaying the (N+3)-th frame of image, the polarity of the sub-pixels in the pixel unit is opposite to the polarity of the sub-pixels when the pixel unit displays the (N+1)-th frame of image.

Further, the pixel colors of the sub-pixels in any one of the pixel units are same, and the pixel colors are red, green, or blue.

Further, the pixel colors of the sub-pixels in the three adjacent pixel units are different.

To achieve the above objective, the present invention also provides a display panel, which includes the pixel driving architecture as described above.

To achieve the above object, the present invention also provides a display device, which includes the display panel as described above, and the display panel includes the pixel driving architecture as described above.

The beneficial effects of this application are: the display is driven by two of the three hybrid inversion modes of column inversion, one-plus-two-line point inversion (1+2line) and two-line point inversion (2line), thereby improving the subjective vertical flicker when the Strip architecture is driven with the column inversion (Strip+column inversion) driving mode alone, and compared with the 1+2Line or 2Line driving mode, the charging effect of the panel is better and can make the twill disappear.

BRIEF DESCRIPTION OF DRAWINGS

The technical solutions and other beneficial effects of the present application will be made obvious by describing the specific implementation manners of the present application in detail below in conjunction with the accompanying drawings.

Figure 1:
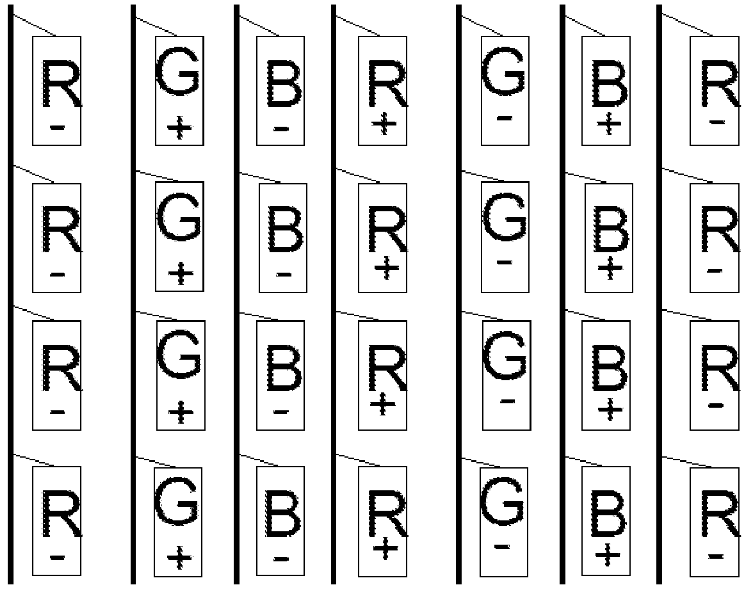
FIG. 1 is a schematic diagram of a pixel driving architecture using a column inversion driving mode in the prior art.
Figure 2:
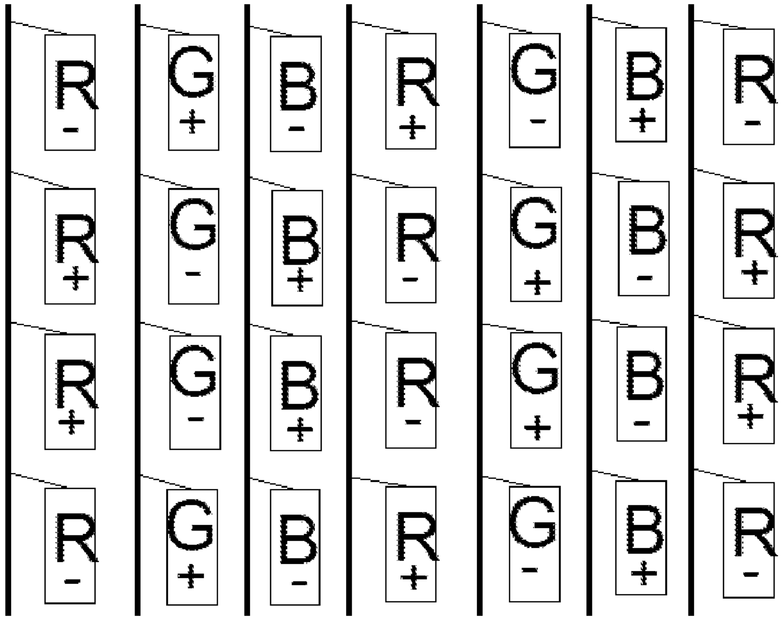
FIG. 2 is a schematic diagram of a pixel driving architecture using a one-plus-two-line point inversion driving mode in the prior art.
Figure 3:
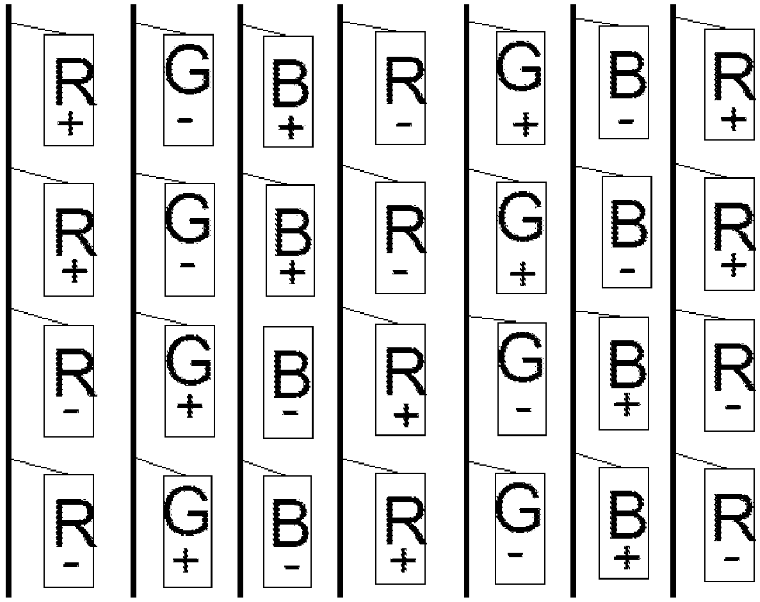
FIG. 3 is a schematic diagram of a pixel driving architecture using a two-line point inversion driving mode in the prior art.

In the figures, "X" is the column direction, "Y" is the row direction, "+" is the positive pole, "−" is the negative pole, "N" is the number of frames, and "M" is the number of rows.

The part numbers in the figures are as follows: 100: pixel driving architecture, 110: pixel unit, 111: sub-pixel, and 120: data line.

DETAILED DESCRIPTION OF EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

A pixel driving architecture uses three hybrid inversion modes of column inversion, one-plus-two-line point inversion (1+2line) and two-line point inversion (2line) to drive a display panel, improving the subjective vertical flicker brought about when the Strip architecture is driven with the column inversion (Strip+column inversion) driving mode alone, and compared with the 1+2Line or 2Line driving mode, the charging effect of the panel is better and can make the twill disappear. As a typical application, the pixel driving architecture of the present invention can be applied to display panels, and specifically, can be applied to ultra-high-definition (UD) LCD panels or 8K LCD panels, and the display panel having the pixel driving architecture provided by the present invention can be used on display devices.

In the present invention, the pixel driving architecture 100 includes a plurality of pixel units 110 and data lines 120. Each pixel unit 110 includes a plurality of sub-pixels 111. The plurality of pixel units 110 are arranged in parallel at intervals along the row direction Y, and each pixel unit 110 includes a plurality of sub-pixels 111 arranged at intervals along the column direction X, forming an array arrangement of the plurality of sub-pixels 111. The plurality of data lines 120 are arranged along the column direction X and are arranged between the plurality of pixel units 110 at intervals along the row direction Y. One pixel unit 110 corresponds to one data line 120, and the sub-pixels 111 in the pixel unit 110 are respectively connected to the data line 120.

The pixel colors of the sub-pixels 111 in any one of the pixel units 110 are same, and the pixel colors are red (R), green (G), or blue (B). The pixel colors of the sub-pixels 111 in the three adjacent pixel units 110 are different.

The polarity arrangement of the sub-pixels 111 in the pixel unit 110 includes following three types:

The first arrangement: the polarities of the sub-pixels 111 in the pixel unit 110 are same, and the polarities of the sub-pixels 111 in two adjacent pixel units 110 are opposite, forming a column inversion arrangement of the polarity of the sub-pixels 111 in the pixel unit 110.

The second arrangement: the sub-pixels 111 in the M-th row and the sub-pixels 111 in the (M+1)-th row in the pixel unit 110 have a same polarity, the polarity of the sub-pixels 111 in the (M+2)-th row is opposite to the polarity of the sub-pixels 111 in the M-th row, and the polarities of the sub-pixels 111 in two adjacent pixel units 110 are opposite, forming a one-plus-two line (1+2 Line) point inversion arrangement of the polarities of the sub-pixels 111 in the pixel unit 110.

The third arrangement: the sub-pixels 111 in the M-th row and the sub-pixels 111 in the (M+1)-th row have a same polarity, and the polarities of the sub-pixels 111 in the (M+2)-th row and the sub-pixels 111 in the (M+3)-th row are opposite to the polarity of the sub-pixels 111 in the M-th row, forming a two-line (2Line) point inversion arrangement of the polarities of the sub-pixels 111 in the pixel unit 110.

Among them, N and M are both positive integers.

In an embodiment of the present invention, please refer to FIG. 4 to FIG. 7, the polarity arrangement of the sub-pixels 111 in the pixel unit 110 is column inversion+one-plus-two-line (1+2 Line) point inversion arrangement, and the arrangement mode uses 4 frames as a period cycle.

Figure 4:
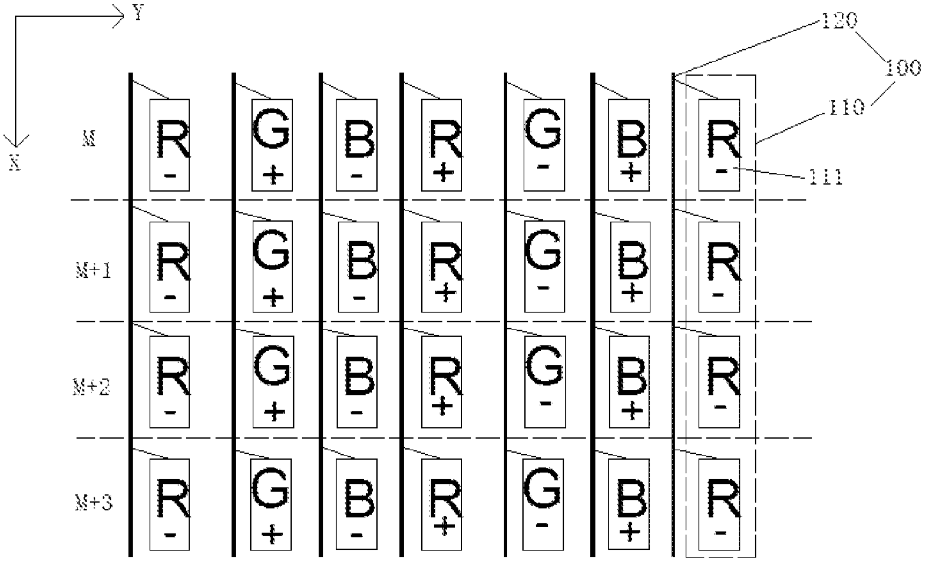
FIG. 4 is a schematic diagram of the polarity arrangement of sub-pixels when the pixel driving architecture provided by an exemplary embodiment of the present invention displays an image of the Nth frame.
Figure 5:
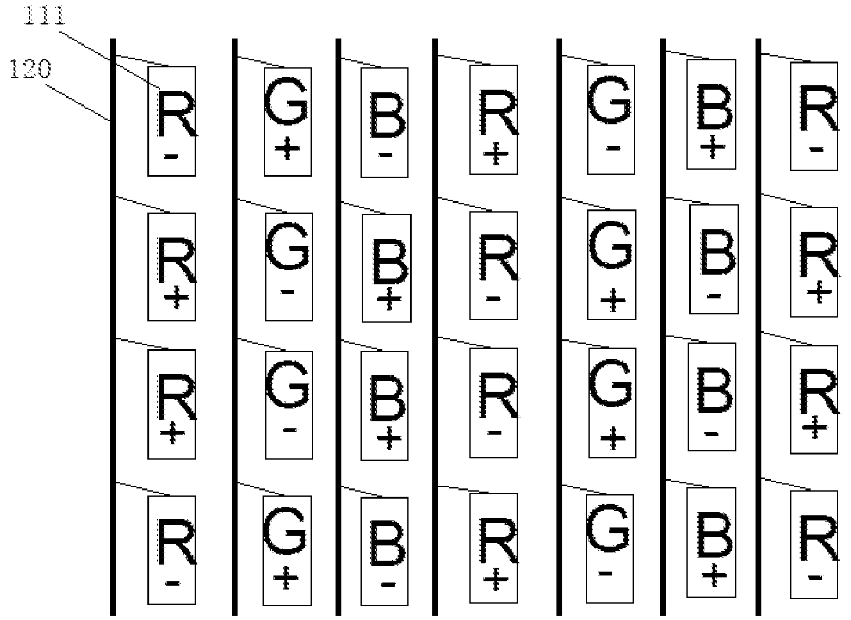
FIG. 5 is a schematic diagram of the polarity arrangement of sub-pixels when the pixel driving architecture provided by an exemplary embodiment of the present invention displays an image of the (N+1)-th frame.
Figure 6:
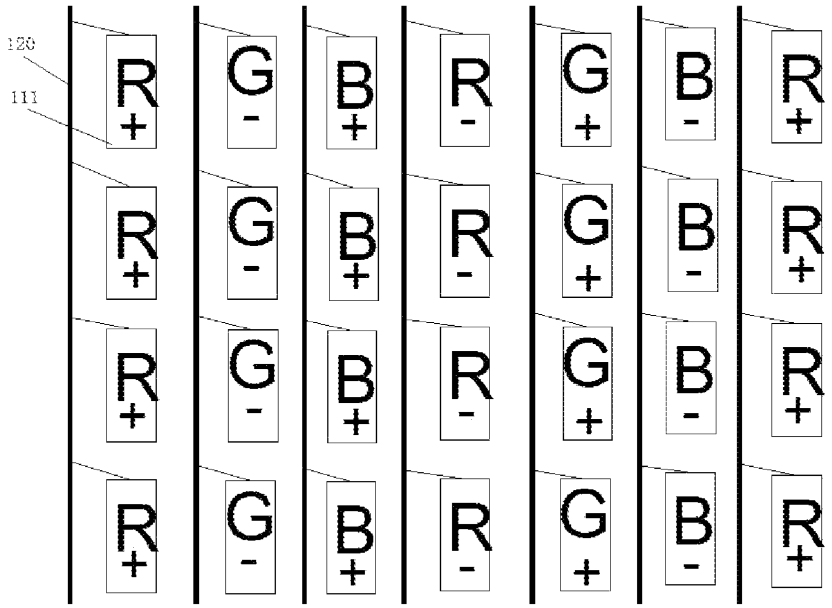
FIG. 6 is a schematic diagram of the polarity arrangement of sub-pixels when the pixel driving architecture provided by an exemplary embodiment of the present invention displays an image of the (N+2)-th frame.
Figure 7:
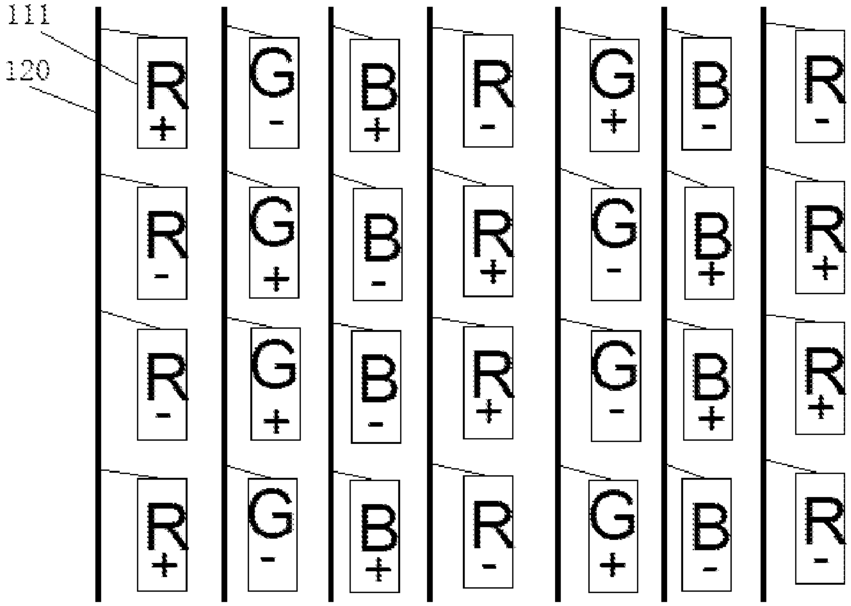
FIG. 7 is a schematic diagram of the polarity arrangement of sub-pixels when the pixel driving architecture provided by an exemplary embodiment of the present invention displays an image of the (N+3)-th frame.

Please refer to FIG. 4, when the pixel driving architecture 100 drives the display panel to display the N-th frame of image, the polarity arrangement of the sub-pixels 111 in the pixel unit 110 is a column inversion arrangement. Please refer to FIG. 6, when the pixel driving architecture 100 drives the display panel to display the (N+1)-th frame of image, the polarity arrangement of the sub-pixels 111 in the pixel unit 110 is a one-plus-two-line (1+2 Line) point inversion arrangement. Please refer to FIG. 7, when the pixel driving architecture 100 drives the display panel to display the (N+2)-th frame of image, the polarity of the sub-pixels 111 in the pixel unit 110 is opposite to the polarity of the sub-pixels 111 when the pixel unit 110 displays the N-th frame of image. Please refer to FIG. 8, when the pixel driving architecture 100 drives the display panel to display the (N+3)-th frame of image, the polarity of the sub-pixel 111 in the pixel unit 110 is opposite to the polarity of the sub-pixels 111 when the pixel unit 110 displays the (N+1)-th frame of image.

In this embodiment, the arrangements may also be as follows: when displaying the N-th frame of image, the polarity arrangement of the sub-pixels 111 is a one-plus-two-line (1+2Line) point inversion arrangement: when displaying the (N+1)-th frame of image, the polarity arrangement of the sub-pixels 111 is a column inversion arrangement: when displaying the (N+2)-th frame of image, the polarity of the sub-pixels 111 in the pixel unit 110 is opposite to the polarity of the sub-pixels 111 when the pixel unit 110 displays the N-th frame of image: when the display panel displays the (N+3)-th frame of image, the polarity of the sub-pixels 111 in the pixel unit 110 is opposite to the polarity of the sub-pixels 111 when the pixel unit 110 displays the (N+1)-th frame of image.

Therefore, the hybrid inversion mode of column inversion+one-plus-two-line (1+2Line) point inversion is realized to drive the display panel for screen display, and adopting the driving method of polarity inversion of the alternate frame to the column inversion and one-plus-two-line (1+2Line) point inversion, that is, reversing at the N-th frame, reversing the polarity of the column inversion of the N-th frame at the (N+2)-th frame, one-plus-two-line (1+2Line) point reversing at the (N+1)-th frame, and reversing the polarity of the one-plus-two-line (1+2Line) point inversion of the (N+1)-th frame at the (N+3)-th frame (i.e., every other frame), thereby improving the subjective vertical flicker when the Strip architecture is driven with the column inversion (Strip+column inversion) driving mode alone, and compared with the 1+2Line or 2Line driving mode, the charging effect of the panel is better and can make the twill disappear.

In another embodiment of the present invention, please refer to FIGS. 8 to 11, the polarity arrangement of the sub-pixels 111 in the pixel unit 110 is column inversion+two-line point inversion, and the arrangement uses 4 frames as a period cycle.

Figure 8:
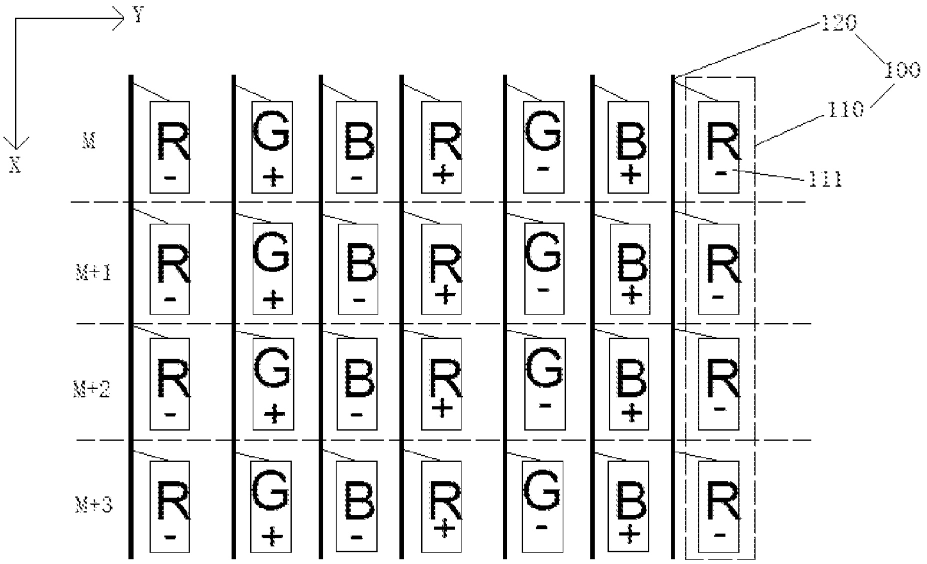
FIG. 8 is a schematic diagram of the polarity arrangement of sub-pixels when the pixel driving architecture provided by another exemplary embodiment of the present invention displays an image of the Nth frame.
Figure 9:
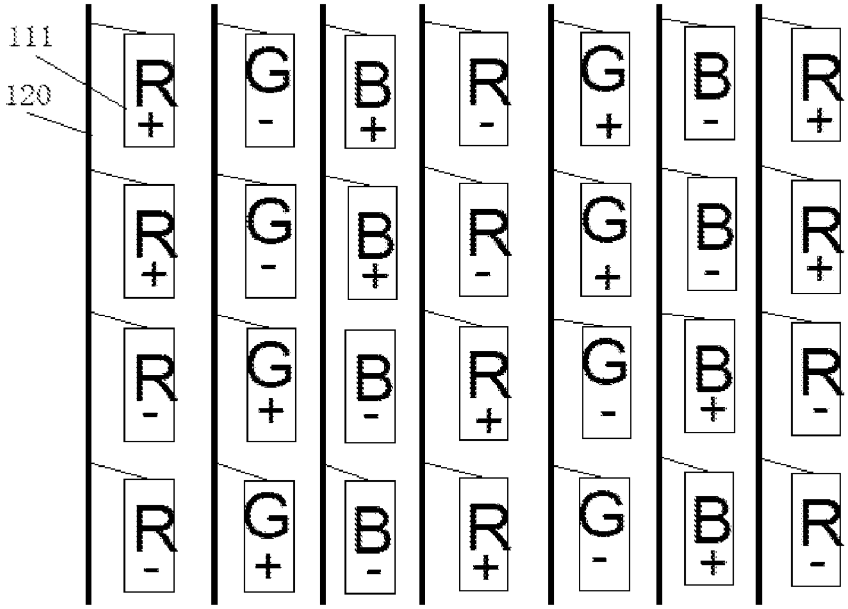
FIG. 9 is a schematic diagram of the polarity arrangement of sub-pixels when the pixel driving architecture provided by another exemplary embodiment of the present invention displays an image of the (N+1)-th frame.
Figure 10:
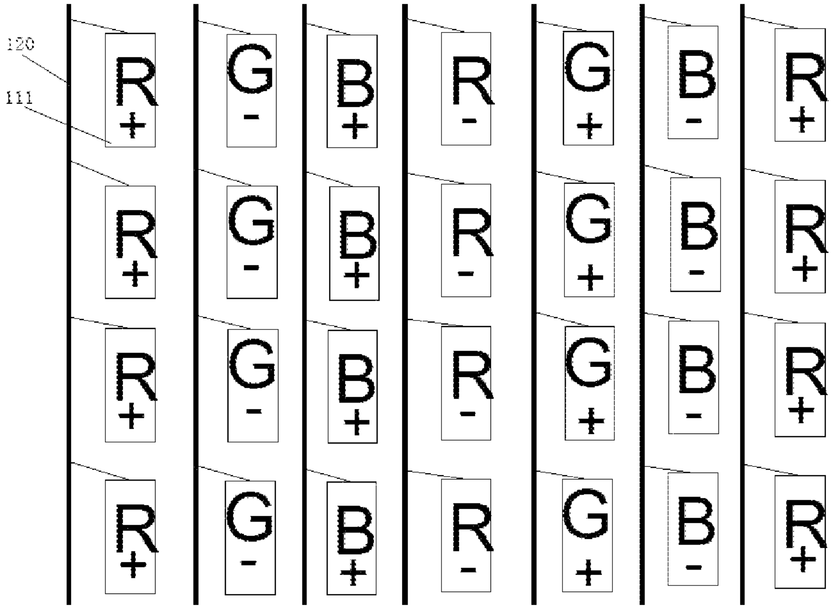
FIG. 10 is a schematic diagram of the polarity arrangement of sub-pixels when the pixel driving architecture provided by another exemplary embodiment of the present invention displays an image of the (N+2)-th frame.
Figure 11:
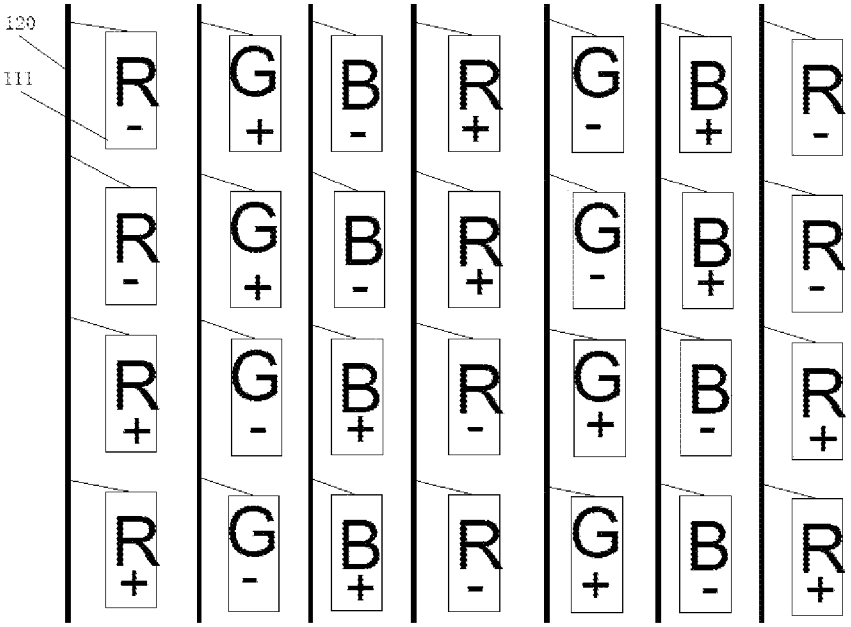
FIG. 11 is a schematic diagram of the polarity arrangement of sub-pixels when the pixel driving architecture provided by another exemplary embodiment of the present invention displays an image of the (N+3)-th frame.

Please refer to FIG. 8, when the pixel driving architecture 100 drives the display panel to display the N-th frame of image, the polarity arrangement of the sub-pixels 111 in the pixel unit 110 is a column inversion arrangement. Please refer to FIG. 10, when the pixel driving architecture 100 drives the display panel to display the (N+1)-th frame of image, the polarity arrangement of the sub-pixels 111 in the pixel unit 110 is a two-line (2Line) point inversion arrangement. Please refer to FIG. 11, when the pixel driving architecture 100 drives the display panel to display the (N+2)-th frame of image, the polarity of the sub-pixels 111 in the pixel unit 110 is opposite to the polarity of the sub-pixels 111 when the pixel unit 110 displays the N-th frame of image. Please refer to FIG. 12, when the pixel driving architecture 100 drives the display panel to display the (N+3)-th frame of image, the polarity of the sub-pixels 111 in the pixel unit 110 is opposite to the polarity of the sub-pixels 111 when the pixel unit 110 displays the (N+1)-th frame of image. The polarity arrangement of the above sub-pixels uses 4 frames as a period cycle.

In this embodiment, the arrangements may also be as follows: when displaying the N-th frame of image, the polarity arrangement of the sub-pixels 111 is a 2Line point inversion arrangement: when displaying the (N+1)-th frame of image The polarity arrangement of the sub-pixels 111 is a column inversion arrangement: when displaying the (N+2)-th frame of image, the polarity of the sub-pixels 111 in the pixel unit 110 is opposite to the polarity of the sub-pixels 111 when the pixel unit 110 displays the N-th frame of image: and when the display panel displays the (N+3)-th frame of image, the polarity of the sub-pixels 111 in the pixel unit 110 is opposite to the polarity of sub-pixels 111 when the pixel unit 110 displays the (N+1)-th frame of image.

In another embodiment of the present invention, the polarity arrangement of the sub-pixels 111 in the pixel unit 110 is column inversion+two-line (2Line) point inversion+one-plus-two-line (1+2Line) point inversion arrangement, and the arrangement uses 6 frames as a period cycle.

When the pixel driving architecture 100 drives the display panel to display the N-th frame of image, the polar arrangement of the sub-pixels 111 in the pixel unit 110 is one of the column inversion, the two-line (2Line) point inversion, and the one-plus-two-line (1+2Line) point inversion. When the pixel driving architecture 100 drives the display panel to display the (N+1)-th frame of image, the polar arrangement of the sub-pixels 111 in the pixel unit 110 is another one of the column inversion, the two-line (2Line) point inversion, and the one-plus-two-line (1+2Line) point inversion. When the pixel driving architecture 100 drives the display panel to display the (N+2)-th frame of image, the polarity arrangement of the sub-pixels 111 in the pixel unit 110 is the other one of the column inversion, the two-line (2Line) point inversion, and one-plus-two-line (1+2Line) point inversion. When the pixel driving architecture 100 drives the display panel to display the (N+3)-th frame of image, the polarity of the sub-pixels 111 in the pixel unit 110 is opposite to the polarity of the sub-pixels 111 when the pixel unit 110 displays the N-th frame of image. When the pixel driving architecture 100 drives the display panel to display the (N+4)-th frame of image, the polarity of the sub-pixels 111 in the pixel unit 110 is opposite to the polarity of the sub-pixels 111 when the pixel unit 110 displays the (N+1)-th frame of image. When the pixel driving architecture 100 drives the display panel to display the (N+5)-th frame of image, the polarity of the sub-pixels 111 in the pixel unit 110 is opposite to the polarity of the sub-pixels 111 when the pixel unit 110 displays the (N+2)-th frame of image.

Specifically, one arrangement in this embodiment is: when the pixel driving architecture 100 drives the display panel to display the N-th frame of image, the polar arrangement of the sub-pixels 111 in the pixel unit 110 is a column inversion arrangement: when the pixel driving architecture 100 drives the display panel to display the (N+1)-th frame of image, the polarity arrangement of the sub-pixels 111 in the pixel unit 110 is a two-line (2Line) point inversion arrangement: when the pixel driving architecture 100 drives the display panel to display the (N+2)-th frame of image, the polarity arrangement of the sub-pixels 111 in the pixel unit 110 is a one-plus-two-line (1+2Line) point inversion arrangement: when the pixel driving architecture 100 drives the display panel to display the (N+3)-th frame of image, the polarity of the sub-pixels 111 in the pixel unit 110 is opposite to the polarity of the sub-pixels 111 when the pixel unit 110 displays the N-th frame of image; when the pixel driving architecture 100 drives the display panel to display the (N+4)-th frame of image, the polarity of the sub-pixels 111 in the pixel unit 110 is opposite to the polarity of the sub-pixels 111 when the pixel unit 110 displays the (N+1)-th frame of image; when the pixel driving architecture 100 drives the display panel to display the (N+5)-th frame of image, the polarity of the sub-pixels 111 in the pixel unit 110 is opposite to the polarity of the sub-pixels 111 when the pixel unit 110 displays the (N+2)-th frame of image.

In summary, although the application has been disclosed as above in preferred embodiments, the above-mentioned preferred embodiments are not intended to limit the application, and those of ordinary skill in the art can make various modifications without departing from the spirit and scope of the application. The protection scope of this application is subject to the scope defined by the claims.

What is claimed is:

1. A pixel driving architecture, comprising:

a plurality of pixel units, arranged in parallel and at intervals along a row direction, each of the pixel units comprises a plurality of sub-pixels arranged at intervals along a column direction; and a plurality of data lines, arranged along the column direction and arranged at intervals between the plurality of pixel units along the row direction, one of the pixel units corresponds to one of the data lines, and the sub-pixels in the one of the pixel units are respectively connected with the one of the data lines;

wherein, when displaying an Nth frame of image, a polarity arrangement of the sub-pixels in the pixel units is one of following three arrangements:

a first arrangement is that polarities of the sub-pixels in the pixel unit are same and polarities of the sub-pixels in two adjacent pixel units are opposite, forming a column inversion arrangement of the polarities of the sub-pixels in the pixel unit;

a second arrangement is that the sub-pixels in the M-th row in the pixel unit have a same polarity as the sub-pixels in the (M+1)-th row, the sub-pixels in the (M+2)-th row have an opposite polarity to the sub-pixels in the M-th row, and the polarities of the sub-pixels in two adjacent pixel units are opposite, forming a one-plus-two-line point inversion arrangement of the polarities of the sub-pixels in the pixel unit; and a third arrangement is that the polarities of the sub-pixels in the M-th row and the sub-pixels in the (M+1)-th row are same, and the polarities of the sub-pixels in the (M+2)-th row and the sub-pixels in the (M+3)-th row are opposite to the polarity of the sub-pixels in the M-th row, forming a two-line point inversion arrangement of the polarities of the sub-pixels in the pixel unit;

when displaying an (N+1)-th frame of image, the polarity arrangement of the sub-pixels in the pixel unit is another one of the three arrangements that is different from the one when displaying the Nth frame of image;

when displaying the (N+2)-th frame of image, the polarity of the sub-pixels in the pixel unit is opposite to the polarity of the sub-pixels when the pixel unit displays the N-th frame of image;

when displaying the (N+3)-th frame of image, the polarity of the sub-pixels in the pixel unit is opposite to the polarity of the sub-pixels when the pixel unit displays the (N+1)-th frame of image;

both M and N are positive integers; and wherein when displaying the N-th frame of image, the arrangement of the polarities of the sub-pixels in the pixel unit is the one-plus-two-line point inversion arrangement or the two-line point inversion arrangement;

when displaying the (N+1)-th frame of image, the arrangement of the polarities of the sub-pixels in the pixel unit is the column inversion arrangement;

when displaying the (N+2)-th frame of image, the polarity of the sub-pixels in the pixel unit is opposite to the polarity of the sub-pixels when the pixel unit displays the N-th frame of image; and when displaying the (N+3)-th frame of image, the polarity of the sub-pixels in the pixel unit is opposite to the polarity of the sub-pixels when the pixel unit displays the (N+1)-th frame of image.

2. The pixel driving architecture of claim 1, wherein the polarity arrangement of a single sub-pixel in the pixel unit uses 4 frames as a period cycle.

3. The pixel driving architecture of claim 1, wherein the pixel colors of the sub-pixels in any one of the pixel units are same, and the pixel colors are red, green, or blue.

4. The pixel driving architecture of claim 3, wherein the pixel colors of the sub-pixels in the three adjacent pixel units are different.

5. A display panel, comprising a pixel driving architecture, wherein the pixel driving architecture comprises:

a plurality of pixel units, arranged in parallel and at intervals along a row direction, each of the pixel units comprises a plurality of sub-pixels arranged at intervals along a column direction; and a plurality of data lines, arranged along the column direction and arranged at intervals between the plurality of pixel units along the row direction, one of the pixel units corresponds to one of the data lines, and the sub-pixels in the one of the pixel units are respectively connected with the one of the data lines;

when displaying an Nth frame of image, a polarity arrangement of the sub-pixels in the pixel units is one of following three arrangements:

a first arrangement is that polarities of the sub-pixels in the pixel unit are same and polarities of the sub-pixels in two adjacent pixel units are opposite, forming a column inversion arrangement of the polarities of the sub-pixels in the pixel unit;

a second arrangement is that the sub-pixels in the M-th row in the pixel unit have a same polarity as the sub-pixels in the (M+1)-th row, the sub-pixels in the (M+2)-th row have an opposite polarity to the sub-pixels in the M-th row, and the polarities of the sub-pixels in two adjacent pixel units are opposite, forming a one-plus-two-line point inversion arrangement of the polarities of the sub-pixels in the pixel unit; and a third arrangement is that the polarities of the sub-pixels in the M-th row and the sub-pixels in the (M+1)-th row are same, and the polarities of the sub-pixels in the (M+2)-th row and the sub-pixels in the (M+3)-th row are opposite to the polarity of the sub-pixels in the M-th row, forming a two-line point inversion arrangement of the polarities of the sub-pixels in the pixel unit;

when displaying an (N+1)-th frame of image, the polarity arrangement of the sub-pixels in the pixel unit is another one of the three arrangements that is different from the one when displaying the Nth frame of image;

when displaying the (N+2)-th frame of image, the polarity of the sub-pixels in the pixel unit is opposite to the polarity of the sub-pixels when the pixel unit displays the N-th frame of image;

when displaying the (N+3)-th frame of image, the polarity of the sub-pixels in the pixel unit is opposite to the polarity of the sub-pixels when the pixel unit displays the (N+1)-th frame of image;

both M and N are positive integers; and wherein when displaying the N-th frame of image, the arrangement of the polarities of the sub-pixels in the pixel unit is the one-plus-two-line point inversion arrangement or the two-line point inversion arrangement;

when displaying the (N+1)-th frame of image, the arrangement of the polarities of the sub-pixels in the pixel unit is the column inversion arrangement;

when displaying the (N+2)-th frame of image, the polarity of the sub-pixels in the pixel unit is opposite to the polarity of the sub-pixels when the pixel unit displays the N-th frame of image; and when displaying the (N+3)-th frame of image, the polarity of the sub-pixels in the pixel unit is opposite to the polarity of the sub-pixels when the pixel unit displays the (N+1)-th frame of image.

6. The display panel of claim 5, wherein the polarity arrangement of a single sub-pixel in the pixel unit uses 4 frames as a period cycle.

7. The display panel of claim 5, wherein the pixel colors of the sub-pixels in any one of the pixel units are same, and the pixel colors are red, green, or blue.

8. The display panel of claim 5, wherein the pixel colors of the sub-pixels in the three adjacent pixel units are different.

9. A display device, comprising the display panel according to claim 5.

10. The display device of claim 9, wherein the polarity arrangement of a single sub-pixel in the pixel unit uses 4 frames as a period cycle.

11. The pixel driving architecture of claim 9, wherein the pixel colors of the sub-pixels in any one of the pixel units are same, and the pixel colors are red, green, or blue.

12. The pixel driving architecture of claim 9, wherein the pixel colors of the sub-pixels in the three adjacent pixel units are different.

13. A pixel driving architecture, comprising:

a plurality of pixel units, arranged in parallel and at intervals along a row direction, each of the pixel units comprises a plurality of sub-pixels arranged at intervals along a column direction; and a plurality of data lines, arranged along the column direction and arranged at intervals between the plurality of pixel units along the row direction, one of the pixel units corresponds to one of the data lines, and the sub-pixels in the one of the pixel units are respectively connected with the one of the data lines;

wherein when displaying an Nth frame of image, a polarity arrangement of the sub-pixels in the pixel units is one of following three arrangements:

a first arrangement is that polarities of the sub-pixels in the pixel unit are same and polarities of the sub-pixels in two adjacent pixel units are opposite, forming a column inversion arrangement of the polarities of the sub-pixels in the pixel unit;

a second arrangement is that the sub-pixels in the M-th row in the pixel unit have a same polarity as the sub-pixels in the (M+1)-th row, the sub-pixels in the (M+2)-th row have an opposite polarity to the sub-pixels in the M-th row, and the polarities of the sub-pixels in two adjacent pixel units are opposite, forming a one-plus-two-line point inversion arrangement of the polarities of the sub-pixels in the pixel unit; and a third arrangement is that the polarities of the sub-pixels in the M-th row and the sub-pixels in the (M+1)-th row are same, and the polarities of the sub-pixels in the (M+2)-th row and the sub-pixels in the (M+3)-th row are opposite to the polarity of the sub-pixels in the M-th row, forming a two-line point inversion arrangement of the polarities of the sub-pixels in the pixel unit;

when displaying an (N+1)-th frame of image, the polarity arrangement of the sub-pixels in the pixel unit is another one of the three arrangements that is different from the one when displaying the Nth frame of image;

when displaying the (N+2)-th frame of image, the polarity of the sub-pixels in the pixel unit is opposite to the polarity of the sub-pixels when the pixel unit displays the N-th frame of image;

when displaying the (N+3)-th frame of image, the polarity of the sub-pixels in the pixel unit is opposite to the polarity of the sub-pixels when the pixel unit displays the (N+1)-th frame of image;

both M and N are positive integers;

wherein the polarity arrangement of a single sub-pixel in the pixel unit uses 4 frames as a period cycle; and wherein when displaying the N-th frame of image, the polarity arrangement of the sub-pixels in the pixel unit is the column inversion arrangement;

when displaying the (N+1)-th frame of image, the polarity arrangement of the sub-pixels in the pixel unit is the one-plus-two-line point inversion arrangement or the two-line point inversion arrangement;

when displaying the (N+2)-th frame of image, the polarity of the sub-pixels in the pixel unit is opposite to the polarity of the sub-pixels when the pixel unit displays the N-th frame of image; and when displaying the (N+3)-th frame of image, the polarity of the sub-pixels in the pixel unit is opposite to the polarity of the sub-pixels when the pixel unit displays the (N+1)-th frame of image.

* * * * *